3,429,692
PROCESS FOR REMOVING MERCURY FROM METALLIC SODIUM CONTAINING THE SAME

Mineo Doi and Masamichi Miura, Toyama-ken, Ryozo Sakuraba, Tokyo, and Takeo Ando, Kanagawa-ken, Japan, assignors to Tekkosha Co., Ltd., Tokyo, Japan, a corporation of Japan
No Drawing. Filed Nov. 14, 1966, Ser. No. 593,672
Claims priority, application Japan, Nov. 25, 1965, 41/71,954
U.S. Cl. 75—63     5 Claims
Int. Cl. C22b 7/00, 27/00, 43/00

This invention relates to a novel and useful process for removing mercury from metallic sodium.

Metallic sodium produced, for example, by the electrolysis of sodium amalgam with the use of a fused salt as an electrolytic bath usually contains a small amount of mercury. Accordingly, it is very important to remove such mercury effectively and inexpensively in order to purify the sodium so that it can be used commercially.

Some processes for removing mercury from mercury-containing sodium have been suggested. One process comprises contacting such contaminated sodium with a sludge of metallic sodium and an alkaline earth metal, such as metallic magnesium, in accordance with the United States Patent No. 2,124,564. Another process comprises contacting such contaminated sodium with metallic calcium at 380° C. in accordance with FIAT Final Report No. 819. However, the mercury content in the sodium so purified is still as much as 0.0004% by weight when treated by the former process utilizing even metallic calcium, which is known as being the most effective mercury-removing reagent, and as much as 0.01% by weight when treated by the latter process. Both processes accordingly leave much to be desired and have disadvantages, such as the necessity of using large amounts of expensive metallic calcium.

It is an object of this invention to provide a novel and useful process for removing mercury from metallic sodium in an effective and inexpensive manner.

According to one embodiment of this invention, mercury-containing sodium in its molten state is contacted with calcium chloride and/or magnesium chloride, whereby the mercury contained in the sodium is removed.

Both of the above-named chlorides may be successfully used individually in an amount approximately equal to the weight of the contained mercury to be removed. When both chlorides are jointly employed, the total amount of the combined calcium and magnesium chlorides, should be approximately equal to the weight of the mercury to be removed.

In the invention, the contacting is preferably carried out at between about 550° C. and about 850° C., whereby the initial mercury-containing sodium may be purified so that after treatment it has a mercury content of less than 0.0001% by weight.

Another embodiment of this invention comprises employing as the mercury-removing reagent a mixture of (1) calcium chloride and/or magnesium chloride, both employed as in the previously described embodiment, and (2) at least one additional salt selected from the group consisting of sodium, barium and strontium chlorides, whereby the contacting may be carried out at temperatures lower than those involved in the former embodiment.

Preferred examples of salt mixtures for carrying out the latter embodiment of the invention include, for example, a two-component mixture of calcium and sodium chlorides and a three-component mixture consisting essentially of 46 to 48% by weight of calcium chloride, 18 to 20% by weight of sodium chloride and 33 to 34% by weight of barium chloride. The melting point of such salt mixtures is below 470° C. and, accordingly, the latter embodiment may be carried out even at temperatures as low as about 470° C., although preferably it is carried out at temperatures between about 470° C. and about 550° C. in order to obtain increased reaction velocity.

The latter embodiment, when compared with said former embodiment, is more advantageous as regards the contact temperatures, as has been discussed immediately above, but it requires, because of its low reaction rate, several times as much of the salt mixture as compared with the weight of the mercury-removing reagent employed in the former embodiment.

The chloride salts used in this invention are preferably anhydrous. When the salts are hydrous, their structural water and/or adhering water converts a corresponding portion of the contaminated sodium to sodium hydroxide, whereby the sodium content is in part wasted, but the effect of the mercury-removing reagent containing such hydrous chloride salts is not reduced at all.

Sodium purified in accordance with this invention contains as little as 0.00002 to 0.00008% by weight of mercury. In other words, the process of this invention provides a greatly increased mercury-removing effect as compared with the conventional processes in which mercury-containing sodium is directly contacted with an alkaline earth metal to remove the mercury. This improved effect is believed to be due to the fact that the contact of the calcium chloride and/or magnesium chloride with the sodium produces many very small particles of calcium and/or magnesium in the nascent state, and that such particles so produced are more likely to contact the mercury present, whereby a calcium and/or magnesium-mercury alloy (i.e., calcium and/or magnesium amalgam) is produced and which can be removed from the reaction system. In other words, the calcium content and/or magnesium content in the mercury-removing reagent salt works effectively to achieve a more complete removal of the mercury.

According to this invention, a much more complete removal of mercury from sodium contaminated with the same can be easily achieved at low cost simply by contacting such contaminated sodium with inexpensive chloride salts, such as calcium chloride and magnesium chloride, in an amount approximately equal to the weight of the mercury contained in the sodium, as compared to a conventional mercury-removing process in which a very expensive alkaline earth metal is required and in a greater amount per amount of mercury removed.

Example I

A hydrous calcium chloride for industrial use (calcium chloride content, 78% by weight) was dehydrated by heating to 400° C. to obtain a product having a calcium chloride content of 98.2% by weight. 1.20 kg. of such dehydrated calcium chloride was added to 70.1 kg. of a metallic sodium (containing 1.68% by weight of mercury) which was maintained at 800° C. and the mixture was maintained at the same temperature for 40 minutes and then allowed to cool by stopping the heating. When the mixture reached a temperature of between 102° C. and 118° C., it was left standing at that temperature for 2 hours.

The metallic sodium so treated, of which the upper layer contained 0.00008% by weight of mercury, gave 66.4 kg. of purified metallic sodium containing 0.00003% by weight of mercury, when filtered through a 100-mesh steel wire cloth.

Example II

A commercially available hydrous magnesium chloride (magnesium chloride content, 45.5% by weight) was dehydrated at a temperature of 180° C. to 210° C. so that it then had a magnesium chloride content of 70.8% by weight. 2.00 kg. of such dehydrated magnesium chloride was added to and mixed well with 0.22 kg. of a very finely powdered sodium chloride dried at 200° C. (sodium chloride content, 98.5% by weight) and then further heated to 690° C., whereby both further dehyration and melting of the mixture occurred.

The molten chloride salt mixture was put in a cylindrical iron vessel equipped with horizontal baffle plates and which was maintained at 690° C. to 700° C. 50 kg. of sodium containing 1.48% by weight of mercury was introduced into the vessel at the bottom thereof and overflowed at the top. The overflowed metallic sodium was taken into another iron vessel and allowed to cool in the same way as in Example I. When it cooled to between 105° C. to 110° C., it was left standing at the same temperature for 2 hours. Then it was filtered and there was obtained 47 kg. of purified metallic sodium containing 0.00008% by weight of mercury.

Example III 50 g. of calcium chloride, 16 g. of sodium chloride and 34 g. of barium chloride, each separately dehydrated at 400° C., were mixed and heated to prepare a molten salt mixture (melting point, about 500° C.). The mixture was put in a cylindrical iron vessel equipped with horizontal baffle plates and was maintained at 550° C., while 1.5 kg. metallic sodium containing 1.33% by weight of mercury was introduced into the vessel at the bottom thereof and overflowed at the top. The overflowed metallic sodium was taken into another iron vessel and allowed to cool in the same way as in Example I. When it cooled to between 104° C. and 112° C., it was left standing at the same temperature for 2 hours. Then it was filtered and there was obtained 1.3 kg. of purified metallic sodium containing 0.00006% by weight of mercury.

The herein described invention is specially useful for purifying sodium metal contaminated with small amounts of mercury, e.g., around 5% or less, to produce substantially pure sodium metal.

It thus may be used in conjunction with other methods for removing mercury from sodium metal amalgams, e.g., by using it to remove the very last traces of the mercury.

However, our invention is not restricted to the removal of small amounts of mercury from sodium metal, because it also may be used to remove mercury from sodium metal amalgams containing large amounts of mercury.

It is to be understood that our invention is not restricted to the specific methods described herein by way of example, since various modifications will be apparent.

The embodiments of the invention in which an exclusive property or privilege is claimed are defined as follows:

1. A process for removing mercury from metallic sodium containing the same which comprises contacting said sodium in its molten state with at least one chloride salt selected from the group consisting of calcium and magnesium chlorides to form an amalgam which is substantially immiscible with said sodium metal and separating said amalgam from said sodium metal.

2. A process as set forth in claim 1, in which said chloride salt is used in an amount at least equal to the weight of the mercury contained in said sodium.

3. A process as set forth in claim 1, in which the contacting is carried out at between 550° C. and 850° C.

4. A process as set forth in claim 1, in which said chloride is used in an amount at least equal to the weight of the mercury contained in said sodium and the contacting is carried out at between 550° C. and 850° C.

5. A process as set forth in claim 1, in which the chloride salt is also mixed with at least one further chloride salt selected from the group consisting of sodium, barium and strontium chlorides.

References Cited

UNITED STATES PATENTS

| | | | |
|---|---|---|---|
| 2,073,631 | 3/1937 | Gilbert | 75—66 X |
| 2,124,564 | 7/1938 | Gilbert et al. | 75—63 |
| 2,224,814 | 12/1940 | Gilbert | 75—66 X |
| 2,452,665 | 11/1948 | Kroll et al. | 75—63 |
| 2,735,668 | 2/1956 | Gruber et al. | 75—63 X |
| 2,750,281 | 6/1956 | Van Haren et al. | 75—66 |
| 3,265,490 | 8/1966 | Yoshizawa et al. | 75—66 |

L. DEWAYNE RUTLEDGE, *Primary Examiner.*

H. W. TARRING, *Assistant Examiner.*

U.S. Cl. X.R.

75—66, 81; 23—25